April 18, 1950  I. I. MORRIS  2,504,144
RIM MEMBER AND METHOD OF MAKING IT
Filed Feb. 24, 1947
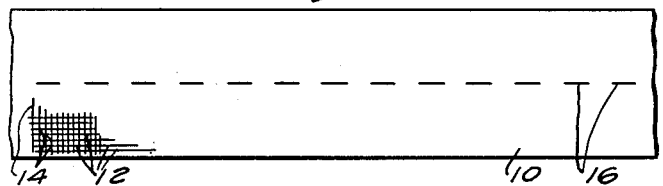
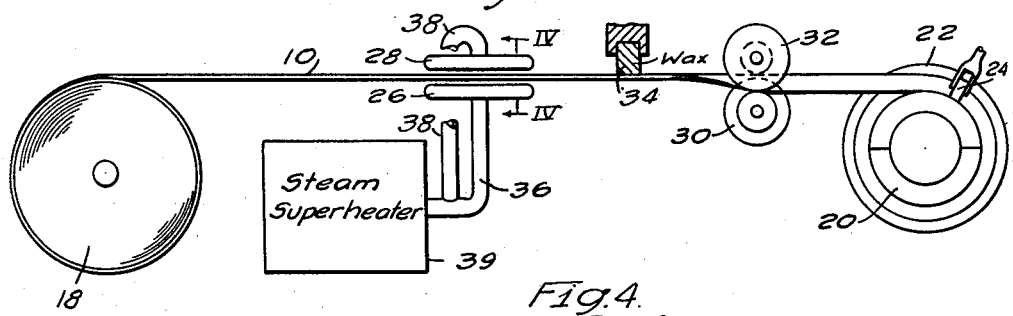
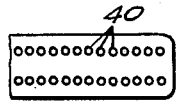
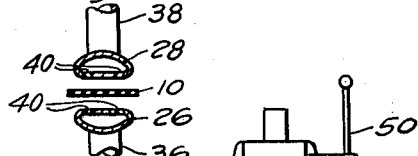
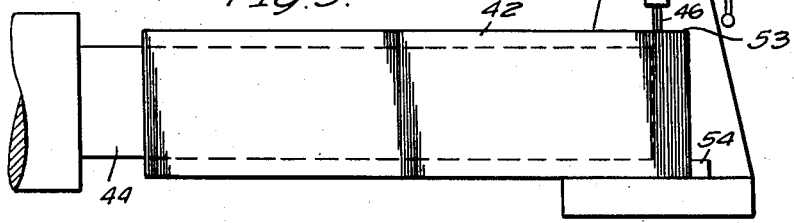
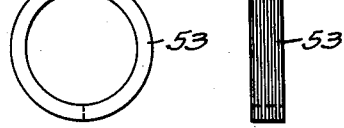
WITNESSES:
E. A. M'Closkey
Nw. C. Groome
INVENTOR
Ivan I. Morris.
BY
James N. Ely
ATTORNEY Patented Apr. 18, 1950

2,504,144

UNITED STATES PATENT OFFICE 2,504,144

RIM MEMBER AND METHOD OF MAKING IT

Ivan I. Morris, Pittsburgh, Pa., assignor to Westinghouse Electric Corporation, East Pittsburgh, Pa., a corporation of Pennsylvania Application February 24, 1947, Serial No. 730,278

11 Claims. (Cl. 154—83)

This invention relates to composite articles and, in particular, to rim members and the method of making them.

Gears and wheels and the like have been made for some time from fibrous material impregnated with a resinous material. In making such composite articles, considerable attention has been directed to the making of laminated rim members of the fibrous material for incorporation in the composite articles. Heretofore, such laminated rim members have been produced by winding a helix from strips of impregnated fibrous material which had been punched or cut to remove material therefrom to facilitate winding of the strip on edge. The known commercial methods of forming such rim members, while producing good articles, have the disadvantage that considerable waste materials are formed while such punching or cutting of the strip weakens the strip and the production costs are greatly increased.

An object of this invention is to provide a laminated rim member formed of helical turns of fibrous material on edge and which have continuous threads throughout the width of the turns.

Another object of this invention is to provide a method of making laminated rim members which embodies the step of subjecting strip material to the action of steam for facilitating the handling and winding of such strip into a cohesive body in the form of a helix free from crimping and overlapping of, or breaks in, the strip material.

Other objects of this invention will become apparent from the following description when taken in conjunction with the accompanying drawing, in which:

Figure 1 is a plan view of a strip of fibrous material impregnated with a resinous binder which is utilized in practicing this invention;

Fig. 2 is a schematic view of apparatus and euipment for producing the rim member and practicing the method of making the rim member in accordance with this invention;

Fig. 3 is a plan view of a part of the face of a steam platen utilized in the apparatus of Fig. 2;

Fig. 4 is a view, partly in section, taken along the line IV—IV of Fig. 2;

Fig. 5 is a schematic representation of apparatus utilized in further processing the material produced on the equipment of Fig. 2;

Fig. 6 is a side view in elevation of the end of the cutting tool utilized in the apparatus of Fig. 5;

Fig. 7 is an end view of the cutting tool of Fig. 6;

Fig. 8 is an end view of the rim member produced in accordance with this invention; and Fig. 9 is a view in side elevation of the rim member.

Referring to Fig. 1, there is illustrated a strip 10 of fibrous material impregnated with a resinous binder, such as phenol formaldehyde resin or urea formaldehyde resin, which is to be processed into a rim member in accordance with this invention. The strip 10 is preferably formed of a woven fabric, such as cotton cloth, having a warp 12 and woof 14, the strip being so cut that the warp threads 12 preferably extend lengthwise of the strip. As illustrated, the strip 10 is provided with a plurality of small or short slits 16 disposed in spaced aligned relation to each other along the center line of the strip to facilitate folding of the strip as will be explained more fully hereinafter. The slits 16 are preferably fine cuts of infinitesimal width, the warp threads 12 on each side of the slits 16 being continuous longitudinally of the strip throughout the width extending from the edges of the slits to the outer edges of the strip.

In practice, the impregnated strip 10, having the spaced slits 16 therein and with the resinous binder in the B stage, is provided in the form of a supply roll 18, as shown in Fig. 2. In practicing this invention, the strip 10 is fed from the supply roll 18 and wound on a slit mandrel 20 which is driven on a lathe (not shown) the strip 10 being wound between a flange member 22 and a pressure roller 24. The winding machine embodying the split mandrel 20 is not illustrated in the schematic sketch of Fig. 2 as such winding machines are well known in the art, reference being had to the gear winding machine illustrated in Patent 1,697,158, issued January 1, 1929, to Bastian for a suitable machine.

In passing the strip 10 from the supply roll 18 to the mandrel 20, the strip 10 is threaded between the faces of the platens 26 and 28 and between folding rollers 30 and 32 from whence it passes to the mandrel 20. As illustrated, a block 34 of a suitable lubricating or wax material, such as calcium stearate, is disposed between the platens 26 and 28 and the folding rollers 30 and 32 for applying a thin dressing of the wax to the strip 10 to facilitate folding and winding of the strip.

The platens 26 and 28 are connected by conduits 36 and 38, respectively, to any suitable steam superheater 39 whereby steam can be delivered to the faces of the platens. In practice, each of the platens 26 and 28 are of a width substantially equal to the width of the strip 10 but are approximately five to seven times as long as the strip is wide. The face of each of the platens 26 and 28 is provided with a plurality of orifices 40 disposed in two rows therealong, as illustrated in Fig. 3. As more clearly shown in Fig. 4, the orifices 40 are angularly disposed to direct and supply jets of steam to impinge along the center line of the strip 10 although it will be appreciated that substantially the whole width of the strip 10 is enveloped in a blanket of steam as the strip 10 passes between the platens 26 and 28.

The folding rollers 30 and 32 are of a construction known to the industry, the roller 30 having a convex rolling face whereas the roller 32 is provided with a concave rolling face. As the strip 10 passes between the rollers 30 and 32, the concave roller 32 forces the strip 10 to bend about the periphery of the convex roller 30 along the center line of the strip, that is, along the line having the slits 16 therein whereby the strip 10 is folded to provide adjacent layers as the strip leaves the rollers 30 and 32. When the folded strip is thus fed to the winding mandrel 20, the strip is wound on edge on the mandrel 20 in the form of a helix, the outer edge of each of the turns having the slits 16 present therein.

In a particular embodiment of this invention, a strip 10 formed of a 15 ounce cotton cloth material and impregnated with phenolic resin is passed from the supply roll 18 to the winding mandrel 20 and wound on edge thereon at a speed of between 7,000 to 8,000 inches per minute. In passing between the steam platens 26 and 28, jets of superheated steam at a temperature of between 250° C. and 270° C. are applied to the strip 10 preferably impinging along the center line thereof to soften the fibers and the B stage resinous binder of the strip. While it is not known for sure, it is possible that the steam functions somewhat as a plasticizer on the uncured resin of the strip as the resin becomes noticeably soft. The steam thoroughly penetrates the strip material and from examination it is believed to tend to force the resinous binder further into the fibers forming the strip material.

As will be appreciated, the application of the steam to the strip is only momentary as the strip passes between the platens at a high speed, the heat thereof being insufficient for converting the resin from the B stage to the C stage. However, at any instant during the winding of the strip on the mandrel 20, steam is applied over a length of the strip equivalent to approximately five to seven times the width of the strip. In the specific embodiment just described where the strip 10 is 1 1/16 of an inch wide, the platens are preferably of a size to cover a surface area on each side of the strip of between four and five square inches.

In winding the folded strip 10 on the mandrel 20, pressure greater than approximately 10 pounds per square inch is preferably applied to the successive turns of the helix. It will, of course, be appreciated that the strip material is still warm when it is wound on the mandrel, the resinous binder thereof still being in a soft condition although the exact temperature of the strip at that point has not been determined. With the resin in this condition, the pressure applied on the turns between the flange 22 and the pressure roller 24 is sufficient for effectively causing the adjacent cohesive layers and turns of the helix to adhere to one another as the material forming the helix cools below the softening temerature of the resinous binder. Where desired, external means may be provided for force cooling of the helix to a temperature below the softening temperature of the resinous binder.

When the strip 10 is thus wound on the mandrel 20 and the material is cooled to below the softening temperature of the resinous binder, the helix can be stripped from the mandrel 20 in the form of a cylinder 42, as illustrated in Fig. 5. This cylinder 42 is substantially a solid cylinder and can readily be handled for further processing.

As illustrated in Fig. 5, the cylinder 42 is positioned on a sleeve 44 of metal which may be supported in any suitable manner. The sleeve 44 is preferably supported and disposed for movement to cooperate with a cutting tool 46, the end of the cylinder 44 terminating closely adjacent to the cutting tool 46. In this embodiment, the cutting tool 46 is carried in an arbor 48, the cutting tool 46 being disposed for an up and down movement when an operating handle 50 is actuated.

As illustrated in Figs. 6 and 7, the cutting edge of the cutting tool 46 is preferably formed with offset cutting edges 51 and 52, the offset being sufficient to overlap exactly one turn of the laminated helix forming the cylinder 42 so that when actuated by a movement of the handle 50, exactly one turn of the folded layers of the helix will be cut to sever a predetermined section of the cylinder 42. The size of the section 53 of the cylinder 42 which is to be severed can be determined by positioning a stop 54 against which the end of the cylinder 42 may abut with respect to the cutting tool 46.

Thus, sections of the cylinder 42 may be cut into any predetermined size and a plurality of such sized sections may be obtained with very little variation as to the size or weight of the sections. The section 53 thus severed from the cylinder 42 will preferably be of a size sufficient for forming a rim member which can thereafter be processed by the application of heat and pressure into a consolidated rim member embodied in a gear or wheel or the like.

As illustrated in Figs. 8 and 9, the section 53 severed from the cylinder 42 is formed of a plurality of turns of the helix, the layers and turns of the helix adhering to each other by reason of the steam and pressure treatment during the method of making the cylinder whereby the section 53 of rim material resulting can be readily handled in the shop in any molding procedure which will be thereafter followed in producing a gear or wheel or the like. The section 53 of rim material of Figs. 8 and 9 is produced without tears or breaks in the material or without overlapping or crimping of the strip material. The resulting product is strong since the warp threads 12 of the strip material are continuous throughout the length of the turns and throughout the width of each turn being only interrupted by the small slits which are at the extreme periphery of the resulting rim member.

The method described hereinbefore results in greatly reducing the cost of rim members which can be thereafter fabricated into molded articles and is performed with substantially no waste while producing a body that can be readily handled. Rim members embodying this invention and produced in accordance with the method described can be readily duplicated.

I claim as my invention:

1. The method of making a rim member comprising, in combination, discontinuously slitting a strip of fibrous material impregnated with a resinous binder substantially along its center line longitudinally of the strip to provide spaced aligned slits, applying superheated steam to the strip to soften the resin therein, folding the softened and slit strip along its center line about the aligned slits to form adjacent layers, and winding the folded strip on edge in the shape of a helix having the aligned slits in the outer edge thereof, the winding being performed while applying pressure to the turns whereby the adjacent layers adhere to each other as the resinous binder cools below the softening temperature of the binder.

2. The method of making a rim member comprising, in combination, discontinuously slitting a strip of woven fibrous material impregnated with a resinous binder along its center line longitudinally of the strip to provide spaced aligned slits having continuous warp threads of the fibers on each side of the aligned slits extending lengthwise of the strip, applying superheated steam to the strip to soften the resinous binder, folding the softened strip along its center line about the spaced aligned slits to form adjacent layers, and winding continuous turns of the folded strip on edge in the form of a helix with the aligned slits in the outer edge periphery thereof and the longitudinally extending warp threads continuous throughout the width of the layers, the winding being performed while applying pressure to the turns whereby the adjacent layers adhere to each other as the resinous binder cools below the softening temperature of the binder.

3. The method of making a rim member comprising, passing a strip of woven fibrous material impregnated with a resinous binder having spaced aligned slits disposed along its center line longitudinally of the strip from a supply roll to a mandrel at a speed of from 7,000 to 8,000 inches per minute, applying steam at a temperature between 250° C. to 270° C. to the strip as it passes to the mandrel to soften the resinous binder, folding the softened strip along its center line about the spaced aligned slits to form adjacent layers before it reaches the mandrel, and winding continuous turns of the folded strip on edge on the mandrel in the form of a helix with the aligned slits in the outer edge thereof, the winding being performed while applying pressure to the turns whereby the adjacent layers adhere to each other as the resinous binder cools below the softening temperature of the binder.

4. The method of making a rim member comprising, passing a strip of woven fibrous material impregnated with a resinous binder having spaced aligned slits disposed along its center line longitudinally of the strip from a supply roll to a mandrel at a speed of 7,000 to 8,000 inches per minute, passing the strip through jets of live steam at a temperature between 250° C. and 270° C. to soften the binder as the strip passes to the mandrel, the steam being applied simultaneously to the opposite sides of the strip to cover a surface area on each side of between four and five square inches at any one instant, folding the softened strip along its center line about the spaced aligned slits to form adjacent layers before it reaches the mandrel, and winding continuous turns of the folded strip on edge on the mandrel in the form of a helix with the slits in the outer edge thereof while applying pressure to the turns to cause the adjacent layers of the different turns to adhere to each other as the resinous binder cools to a temperature below the softening temperature of the binder.

5. The method of making a rim member comprising, passing a strip of woven fibrous material impregnated with a resinous binder having spaced aligned slits disposed along its center line longitudinally of the strip from a supply roll to a mandrel, passing the strip through vapors of superheated steam to soften the resin as the strip passes to the mandrel, folding the strip along its center line about the spaced aligned slits after it is subjected to the steam to form adjacent layers before the strip reaches the mandrel, and winding continuous turns of the folded strip on edge on the mandrel in the form of a helix with the slits in the outer edge thereof while applying pressure to the turns to cause the adjacent layers of the different turns to adhere to each other as the resinous binder cools to a temperature below the softening temperature of the binder.

6. The method of making a rim member comprising, passing a strip of woven fibrous material impregnated with a resinous binder having spaced aligned slits disposed along its center line longitudinally of the strip from a supply roll to a mandrel, passing the strip through vapors of superheated steam to soften the resin as the strip passes to the mandrel, folding the strip along its center line about the spaced aligned slits after it is subjected to the steam to form adjacent layers before the strip reaches the mandrel, winding continuous turns of the folded strip on edge on the mandrel in the form of a helix with the slits in the outer edge thereof while applying pressure to the turns to cause the adjacent layers of the different turns to adhere to each other as the resinous binder cools to a temperature below the softening temperature of the binder, and thereafter severing the wound helix into a plurality of pieces of substantially equal size by cutting only one turn of the folded strip at each point of severance, the turns of each severed piece remaining adherent to adjacent turns to facilitate the handling of the pieces.

7. The method of making a rim member comprising, passing a strip of woven fibrous material impregnated with a resinous binder having spaced aligned slits disposed along its center line longitudinally of the strip from a supply roll to a mandrel at a speed of 7,000 to 8,000 inches per minute, passing the strip through jets of live steam at a temperature between 250° C. and 270° C. to soften the binder as the strip passes to the mandrel, the steam being applied simultaneously to the opposite sides of the strip to cover a surface area on each side of between four and five square inches at any one instant, folding the softened strip along its center line about the spaced aligned slits to form adjacent layers before it reaches the mandrel, winding continuous turns of the folded strip on edge on the mandrel in the form of a helix with the aligned slits in the outer edge thereof while applying pressure to the turns to cause the adjacent layers of the different turns to adhere to each other as the resinous binder cools to a temperature below the softening temperature of the binder, and thereafter severing the wound helix into a plurality of pieces of substantially equal size by cutting only one turn of the folded strip at each point of severance, the turns of each severed piece remaining adherent to adjacent turns to facilitate handling of the pieces.

8. In a rim member, the combination comprising, a plurality of turns of strip material, the strip comprising woven fibrous material impregnated with a resinous binder, the turns being helically wound of continuous strip material folded longitudinally at its center to form adjacent layers, each layer of the woven fibrous material having continuous longitudinally extending warp threads therein throughout the width of the layer, the adjacent layers and turns being adherent to each other to facilitate handling of the wound fibrous material.

9. In a rim member, the combination comprising a plurality of turns of strip material, the strip comprising woven fibrous material impregnated with a resinous binder and having spaced aligned slits disposed only at its center longitudinally thereof, the turns being helically wound of the continuous strip material folded longitudinally at its center about the spaced slits to form adjacent layers having the slits in the outer edge thereof, each layer of the woven fibrous material having the longitudinally extending fibers therein present as continuous threads throughout the width of the layer, the adjacent layers and turns being adherent to each other to facilitate handling of the wound fibrous material.

10. In a rim member, the combination comprising a plurality of turns of strip material, the strip comprising woven fibrous material impregnated with a resinous binder and having spaced aligned slits disposed only at its center longitudinally thereof, the turns being helically wound of continuous strip material folded longitudinally at its center about the spaced slits to form adjacent layers having the spaced slits in the outer edge thereof, each layer of the woven fibrous material having continuous longitudinally extending warp threads therein throughout the width of the layer, the adjacent layers and turns being adherent to each other to facilitate handling of the wound fibrous material.

11. In a rim member, the combination comprising a plurality of turns of strip material, the strip comprising woven fibrous material impregnated with phenol formaldehyde resinous binder and having spaced slits disposed only at its center longitudinally thereof, the turns being helically wound of continuous strip material folded longitudinally at its center about the spaced slits to form adjacent layers having the spaced slits in the outer edge thereof, each layer of the woven fibrous material having continuous longitudinally extending warp threads therein throughout the width of the layer, the adjacent layers and turns being adherent to each other to facilitate handling of the wound fibrous material.

IVAN I. MORRIS.

REFERENCES CITED

The following references are of record in the file of this patent:

UNITED STATES PATENTS

| Number | Name | Date |
|---|---|---|
| 1,622,048 | Pierson | Mar. 22, 1927 |
| 1,697,158 | Bastian | Jan. 1, 1929 |
| 1,779,295 | Small | Oct. 21, 1930 |
| 2,096,692 | Cilley | Oct. 19, 1937 |
| 2,414,535 | Kaufman | Jan. 21, 1947 |